US012121798B2

(12) United States Patent
Liu

(10) Patent No.: US 12,121,798 B2
(45) Date of Patent: Oct. 22, 2024

(54) METHOD AND RELATED APPARATUS FOR APPLICATION OF SCOPE IN VIRTUAL ENVIRONMENT

(71) Applicant: Tencent Technology (Shenzhen) Company Limited, Shenzhen (CN)

(72) Inventor: Zhihong Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 275 days.

(21) Appl. No.: 17/504,081

(22) Filed: Oct. 18, 2021

(65) Prior Publication Data

US 2022/0032176 A1    Feb. 3, 2022

Related U.S. Application Data

(63) Continuation of application No. PCT/CN2020/103000, filed on Jul. 20, 2020.

(30) Foreign Application Priority Data

Aug. 22, 2019 (CN) .......................... 201910780269.9

(51) Int. Cl.
*A63F 13/2145* (2014.01)
*A63F 13/52* (2014.01)

(52) U.S. Cl.
CPC .......... *A63F 13/2145* (2014.09); *A63F 13/52* (2014.09)

(58) Field of Classification Search
CPC ............................. A63F 13/2145; A63F 13/52
See application file for complete search history.

(56) References Cited

U.S. PATENT DOCUMENTS

2021/0260479 A1    8/2021   Yang

FOREIGN PATENT DOCUMENTS

CN    103631408 A    3/2014
CN    107678647 A    2/2018
(Continued)

OTHER PUBLICATIONS sagyoutube.blogspot.com, "PUBG Mobile | Pro Settings/Controls/Sensitivity to Get Chicken Dinner Easily", Jan. 2019. (Year: 2019).*

(Continued)

*Primary Examiner* — Werner G Garner
(74) *Attorney, Agent, or Firm* — Crowell & Moring LLP

(57) ABSTRACT

This application discloses a method and apparatus for application of a scope in a virtual environment, a device, and a storage medium, and relates to the field of virtual environments. The method includes: displaying a first environment interface, the first environment interface comprising a person perspective picture of the virtual environment observed from a person perspective of a virtual object, the virtual object holding a virtual item; receiving a touch operation on the scope control; displaying a second environment interface according to the touch operation, the second environment interface comprising a scope picture of the virtual environment observed by using the scope accessory; determining a touch duration of the touch operation in response to an end of the touch operation; determining a de-activation condition for the scope accessory based on the touch duration and a duration threshold; and disabling the scope accessory and resuming displaying the person perspective picture in response to the de-activation condition being met.

17 Claims, 10 Drawing Sheets

(56) References Cited

FOREIGN PATENT DOCUMENTS

| CN | 108339272 | A | 7/2018 |
|---|---|---|---|
| CN | 110141869 | A | 8/2019 |
| CN | 110448908 | A | 11/2019 |
| JP | 6042502 | B2 | 12/2016 |

OTHER PUBLICATIONS

Erika Okumura, :Knives Out, Mar. 9, 2018, Uptodown.com. (Year: 2018).*

Office Action for Japanese Patent Application No. 2021-554634 dated Mar. 28, 2023, 8 pages.

Tension Max, Izayoi, "[Wilderness Action] If you don't know, it's a loss!! master it SR musou duh!?[Knives out commentary]," https://www.youtube.com/watch?v=AmDJSeQuvOg, published Apr. 20, 2018, accessed Mar. 24, 2023, 3 pages.

Office Action with Search Report and Written Opinion for Singaporean Patent Application No. 11202109672U dated Jan. 16, 2023, 11 pages.

Office Action with English Translation of Notification of Reasons for Refusal Japanese Patent Application No. 2021-554634 dated Oct. 21, 2022, 9 pages.

[Wilderness Action] Just set it to the hot topic "Pro Mode"!! Lean shooting is the best Easy to use!! Each mode "scope shooting logic" "scope on method" details Introducing! (Virtual YouTuber), YouTube[online][video], Apr. 13, 2019 https://www.youtube.com/watch?v=YNZCwQurois,_video, time: [07:40]-[09:50].

[PUBG Mobile]Aim power up with this! Scope sensitivity is terrifyingly important [PUBG for smartphone], YouTube[online][video], Jun. 13, 2018, https://www.youtube.com/watch?v=OzHGRB8uats,_video, time: [00:00]-[03:10].

Office Action with Office Action Summary in English for Korean Patent Application No. 10-2021-7032917 dated Aug. 7, 2023, 14 pages.

"Finally Night Mode, Must-know tips for adding QBU!" YouTube Video, (Oct. 26, 2018), https://www.youtube.com/watch?v=9i1gsFF33WE, published Oct. 26, 2018, 1 page.

"[No Gyro] We'll make your aim a recoil-free laser. Tips from conquerors—setting, sensitivity, recoil, aim correction, magnification, and more!" YouTube Video, (May 12, 2019), https://www.youtube.com/watch?v=xpSDTPQTM_0, published May 12, 2019, 1 page.

"[Battlegrounds Mobile] Setting up a 2-finger key placement on a mobile phone (example of iPhone XS). Let's finish setting up the keys! Lecture on how to do Battlegrounds Mobile well," YouTube Video, https://www.youtube.com/watch?v=STVk6AgnuK4, published Jun. 20, 2019, 1 page.

International Search Report and Written Opinion for International Application No. PCT/CN2020/103000 dated Oct. 22, 2020; 13 pages.

Office Action with English Translation of Concise Explanation of Relevance for Chinese Patent Application No. 201910780269.9 dated Mar. 25, 2020, 16 pages.

Office Action with English Translation of Concise Explanation of Relevance for Chinese Patent Application No. 201910780269.9 dated Sep. 11, 2020, 4 pages.

Office Action issued on Korean Application 10-2021-7032917, dated Feb. 22, 2024, including English summary, 11 pages.

https://www.youtube.com/watch?v=YNZCwQurois "Scope on Method" Apr. 13, 2019.

https://www.youtube.com/watch?v=STVk6AgnuK4 Setting up a 2-finger key placement on a mobile phone, Jun. 20, 2019.

NanYan, bilibili.com Online video: Key distribution game tutorial https://www.bilibili.com/video/av40932145?form=search&seid=7356033619029904779 dated Jan. 17, 2019, including herewith a concise explanation of relevanace (1 page).

Bubble under the sun, baidu.com Battlegrounds stimulate the battlefield mixed shooting mode how to use, dated Aug. 2, 2018 (also available at https://jingyan.baidu.com/article/fd8044fa10b70d5031137abd.html), including a concise explanation of relevance (3pages).

* cited by examiner

METHOD AND RELATED APPARATUS FOR APPLICATION OF SCOPE IN VIRTUAL ENVIRONMENT

RELATED APPLICATION

This application is a continuation application of the International PCT Application No. PCT/CN2020/103000, filed with the China National Intellectual Property Administration, PRC on Jul. 20, 2020 which claims priority to Chinese Patent Application No. 201910780269.9, filed with the China National Intellectual Property Administration, PRC on Aug. 22, 2019, each of which is incorporated herein by reference in its entirety.

FIELD OF THE TECHNOLOGY

Embodiments of this disclosure relate to the field of virtual environments, and in particular, to application of a scope in a virtual environment.

BACKGROUND OF THE DISCLOSURE

In an application including a virtual environment, a virtual object in the virtual environment usually needs to be controlled to move in the virtual environment. A user may control the virtual object to be in a running posture, a walking posture, a standing posture, a flat-lying posture, a creeping posture, or the like in a three-dimensional (3D) virtual environment. When the virtual environment is observed, the virtual environment may be observed from a first-person perspective or a third-person perspective of the virtual object (that is, the virtual environment is observed from a person perspective), or may be observed by using a scope accessory.

In the related art, a scope control may be used to switch between the person perspective observation manner and the scope accessory observation manner. That is, when the virtual environment is observed in the person perspective observation manner, the observation manner may be switched to the scope accessory observation manner by tapping the scope control. When the virtual environment is observed in the scope accessory observation manner, the observation manner may be switched to the person perspective observation manner by tapping the scope control.

SUMMARY

Embodiments of this disclosure provide a method and a related apparatus for application of a scope in a virtual environment, to resolve the problem of low efficiency and low accuracy of observing a virtual environment. The technical solutions are as follows:

In an aspect, a method for application of a scope in a virtual environment is provided, the method including:
  displaying a first environment interface, the first environment interface including a person perspective picture of the virtual environment observed from a person perspective of a virtual object, the virtual object holding a virtual item, the virtual item being equipped with a scope accessory, and the first environment interface further including a scope control;
  receiving a touch operation on the scope control and generating a touch signal;
  displaying a second environment interface according to the touch signal, the second environment interface including a scope picture of the virtual environment observed by using the scope accessory; and
  resuming displaying the person perspective picture in a case that a touch end signal of the touch operation is received.

In another aspect, an apparatus for application of a scope in a virtual environment is provided, the apparatus including:
  a display module, configured to display a first environment interface, the first environment interface including a person perspective picture of the virtual environment observed from a person perspective of a virtual object, the virtual object holding a virtual item, the virtual item being equipped with a scope accessory, and the first environment interface further including a scope control; and
  a receiving module, configured to receive a touch operation on the scope control and generate a touch signal;
  the display module being further configured to display a second environment interface according to the touch signal, the second environment interface including a scope picture of the virtual environment observed by using the scope accessory; and
  the display module being further configured to resume displaying the person perspective picture in a case that a touch end signal of the touch operation is received.

In another aspect, a computer device is provided, including a processor and a memory, the memory storing at least one instruction, at least one program, a code set, or an instruction set, the at least one instruction, the at least one program, the code set, or the instruction set being loaded and executed by the processor to implement the method for application of a scope in a virtual environment according to the foregoing embodiment of this application.

In another aspect, a storage medium is provided, configured to store a computer program, the computer program being configured to perform the method for application of a scope in a virtual environment according to the foregoing embodiment of this application.

In another aspect, a computer program product is provided, the computer program product, when run on a computer, causing the computer to perform the method for application of a scope in a virtual environment according to the foregoing embodiment of this application.

The technical solutions provided in the embodiments of this disclosure produce at least the following beneficial effects:

A scope control is disposed, and a corresponding touch signal and touch end signal are determined according to whether a touch operation on the scope control is continuous. In this way, only a single touch on the scope control is required to switch between a person perspective picture observed without a scope accessory and a scope picture observed with the scope accessory, thereby improving the enabling efficiency of the scope accessory, and improving the efficiency and accuracy of observing a virtual environment.

BRIEF DESCRIPTION OF THE DRAWINGS

To describe technical solutions in embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from these accompanying drawings without creative efforts.

DESCRIPTION OF EMBODIMENTS

Figure 1:
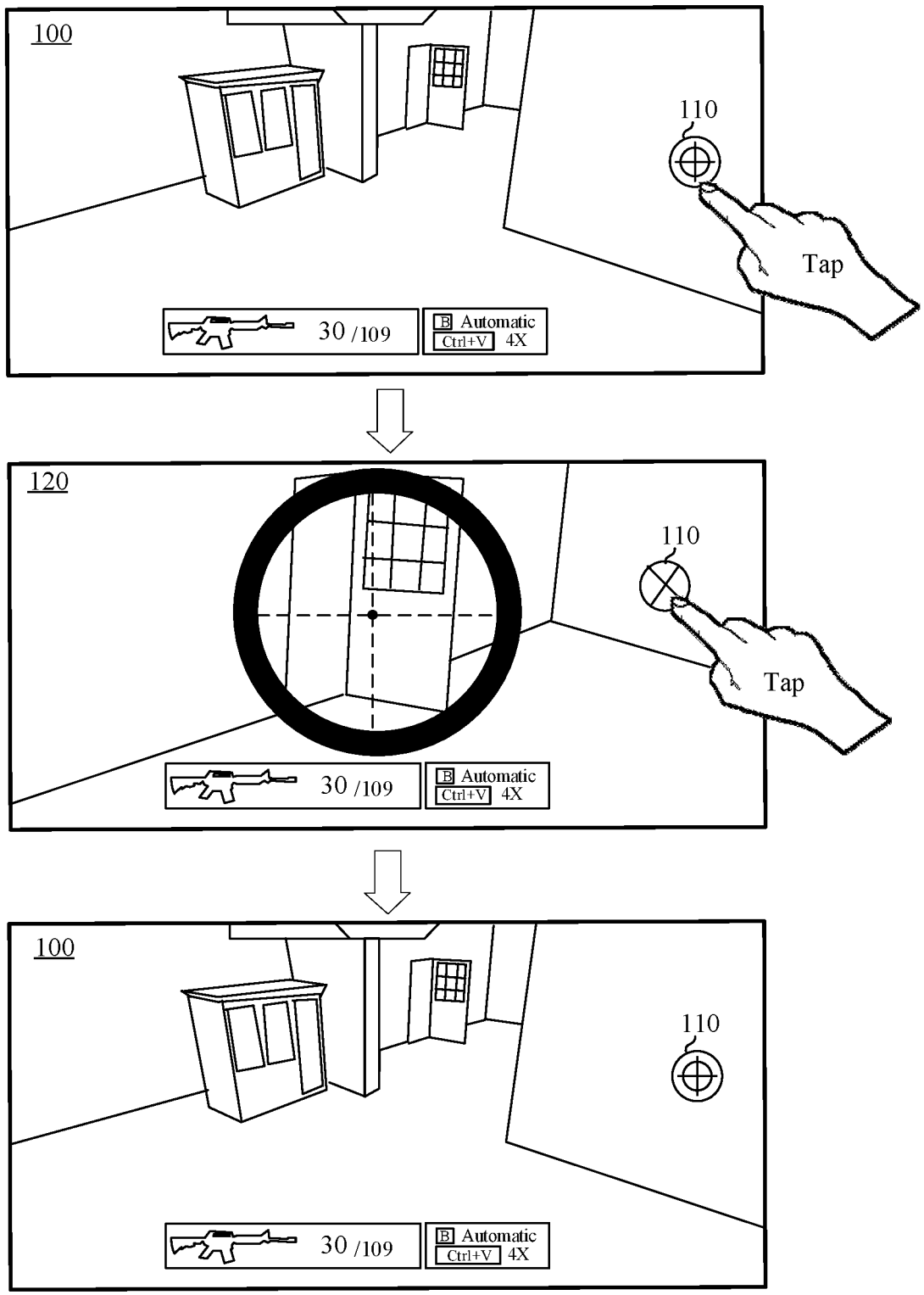
FIG. 1 is a schematic interface diagram of application of a scope accessory in a virtual environment according to the related art.

To make objectives, technical solutions, and advantages of this application clearer, the following further describes implementations of this application in detail with reference to the accompanying drawings.

First, terms involved in the embodiments of this disclosure are briefly introduced.

Virtual environment is displayed (or provided) when an application runs on a terminal. The virtual environment may be a simulated environment of the real world, or may be a semi-simulated semi-fictional 3D environment, or may be an entirely fictional 3D environment. The virtual environment may be any one of a two-dimensional virtual environment, a 2.5-dimensional virtual environment, and a 3D virtual environment. A description is made by using an example in which the virtual environment is a 3D virtual environment in the following embodiments, but this is not limited. For example, the virtual environment may be used for a virtual environment battle between at least two virtual roles. For another example, the virtual environment may be further used for a battle performed between at least two virtual roles by using virtual guns. For another example, the virtual environment may be further used for a battle performed between at least two virtual roles by using virtual guns in a range of a target region, and the range of the target region may be continuously decreased as time goes by in the virtual environment.

Virtual object includes a movable object in a virtual environment. The movable object may be a virtual character, a virtual animal, a cartoon character, or the like, such as a character, an animal, a plant, an oil drum, a wall, a stone, or the like displayed in a 3D virtual environment. For example, the virtual object may be a 3D model created based on a skeletal animation technology. Each virtual object has a shape and size in the 3D virtual environment, and occupies some space in the 3D virtual environment.

Virtual gun includes a virtual weapon that attacks by shooting bullets in a virtual environment. A virtual object may pick up the virtual gun in the virtual environment, and attack by using the virtual gun obtained through picking-up. Optionally, each virtual gun may be provided with at least one slot for fitting at least one gun accessory. For example, An M416 automatic rifle is generally provided with a muzzle slot, a grip slot, a magazine slot, a stock slot, and a scope slot, where the scope slot may be equipped with any one of a red dot scope, a holographic scope, a 2× scope, a 4× scope, and an 8× scope. When a player holds the M416 automatic rifle and aims down the scope, the virtual environment may be magnified to a specific extent for observation according to the scope equipped on the gun.

In the embodiments of this disclosure, a virtual gun is used as an example for description. The virtual item is equipped with a scope accessory, that is, a scope slot of the virtual gun is equipped with a scope accessory. Optionally, the scope accessory may be an original mechanical scope equipped on the virtual gun, or may be a scope picked up by a virtual object in a virtual environment.

The method provided in this disclosure may be applied to a virtual reality (VR) application, a 3D map application, a military simulation program, a first-person shooting game (FPS), a multiplayer online battle arena game (MOBA), and the like. Application during a game is used as an example for description in the following embodiments.

A game based on a virtual environment usually includes maps of one or more game worlds. The virtual environment in the game simulates scenes in the real world. A user may control a virtual object in the game to perform actions in the virtual environment such as walking, running, jumping, shooting, combating, driving, switching to virtual weapons, and using a virtual weapon to attack another virtual object, which has high interactivity. In addition, a plurality of users may form a team online to perform an arena game. When a user controls a virtual object to use a virtual weapon to attack a target virtual object, the user selects a suitable virtual weapon to attack the virtual object according to a position or operating habits of the target virtual object.

In the related art, a scope control is usually provided in an environment interface for switching between virtual environment observation manners. As shown in FIG. 1, a person perspective picture 100 of a virtual environment observed from a first-person perspective of a virtual object is displayed in a first environment interface. The virtual object holds a virtual item (for example, a virtual gun). The virtual item is equipped with a scope accessory. A scope control 110 is superimposed and displayed on the person perspective picture 100. After a user taps the scope control 110, a scope picture 120 is displayed. The scope picture 120 is a picture of the virtual environment observed by using the scope accessory. The scope control 110 is superimposed and displayed on the scope picture 120. The scope control 110 is displayed in a shape of a cross shown in FIG. 1 after the scope accessory is enabled. When the user taps the scope control 110 again, the scope accessory is disabled, and displaying the person perspective picture 100 from the first-person perspective is resumed.

Figure 2:
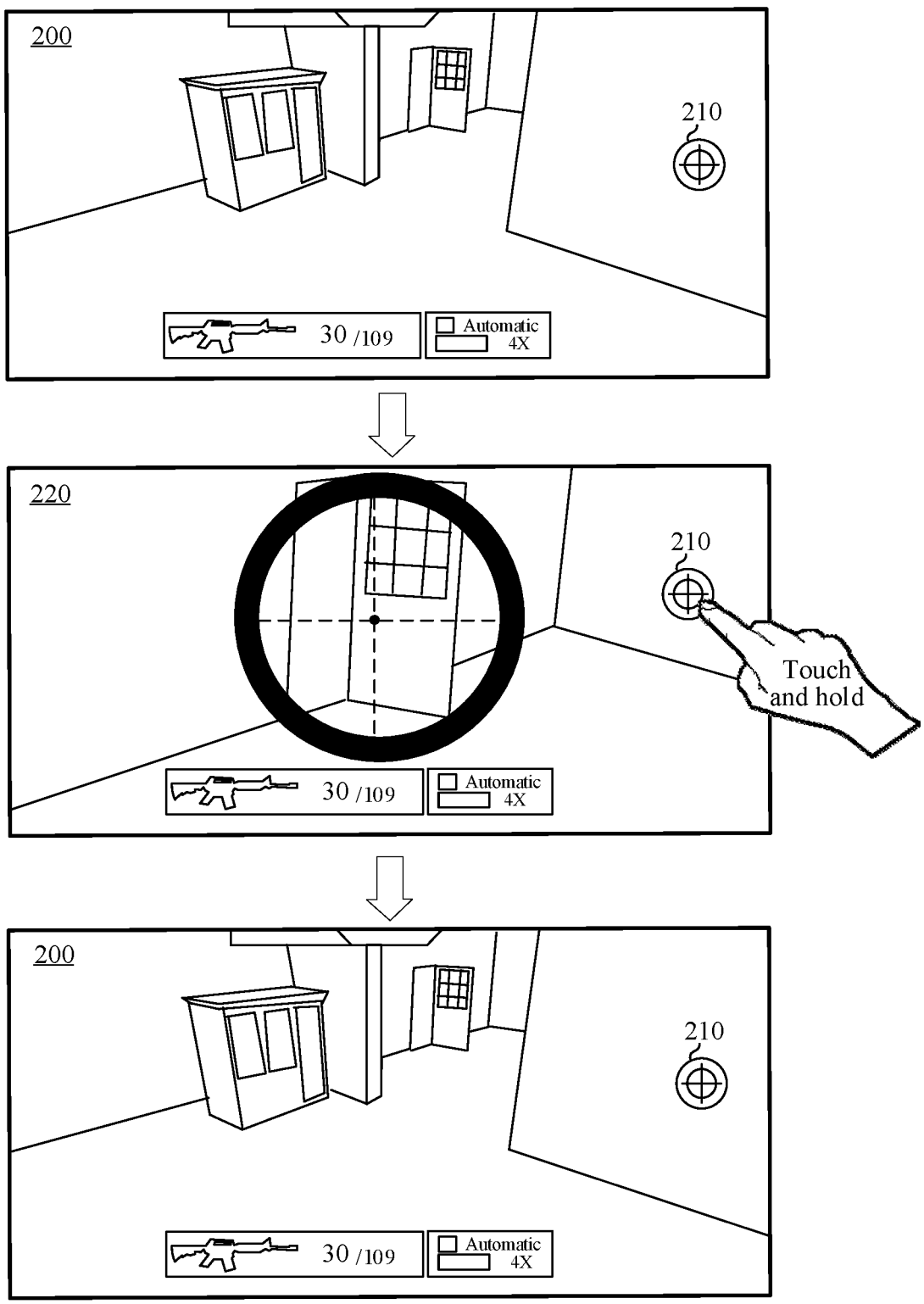
FIG. 2 is a schematic interface diagram of application of a scope accessory in a virtual environment according to an exemplary embodiment of this application.

The embodiments of this disclosure provide a method for application of a scope in a virtual environment. FIG. 2 is a schematic interface diagram of a method for application of a scope in a virtual environment according to an embodiment of this application. As shown in FIG. 2:

A person perspective picture 200 of a virtual environment observed from a first-person perspective of a virtual object is displayed in a first environment interface. The virtual object holds a virtual item (for example, a virtual gun). The virtual item is equipped with a scope accessory. A scope control 210 is superimposed and displayed on the person perspective picture 200. After a user touches the scope control 210, a scope picture 220 is displayed. The scope picture 220 is a picture of the virtual environment observed by using the scope accessory. When the user presses and holds the scope control 210, a terminal keeps displaying the scope picture 220. When the user releases the touch on the scope control 210, the terminal disables the scope accessory and resumes displaying the person perspective picture 200. Picture content of the person perspective picture 200 may be changed from the initial picture. For example, the picture content may be changed due to movement of the virtual object, displacement of stuff in the virtual environment, or the like. Alternatively, the picture content of the person perspective picture 200 may be unchanged.

The terminal in this application may be a desktop computer, a portable laptop computer, a mobile phone, a tablet computer, an eBook reader, a Moving Picture Experts Group Audio Layer III (MP3) player, a Moving Picture Experts Group Audio Layer IV (MP4) player, or the like, which is equipped with a display component. An application supporting a virtual environment is installed and run on the terminal, such as an application supporting a 3D virtual environment. The application may be any one of a VR application, a 3D map application, a military simulation application, a TPS game, an FPS game, and a MOBA game. Optionally, the application may be a standalone application, such as a standalone 3D game application, or may be an online application.

Figure 3:
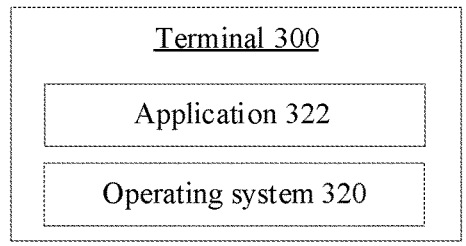
FIG. 3 is a structural block diagram of a terminal according to an exemplary embodiment of this application.

FIG. 3 is a structural block diagram of an electronic device according to an exemplary embodiment of this application. The electronic device 300 includes an operating system 320 and an application 322.

The operating system 320 is basic software provided for the application 322 to perform secure access to computer hardware.

The application 322 is an application supporting a virtual environment. Optionally, the application 322 is an application supporting a 3D virtual environment. The application 322 may be any one of a VR application, a 3D map application, a military simulation application, a TPS game, an FPS game, a MOBA game, and a multiplayer shooting survival game. The application 322 may be a standalone application, such as a standalone 4D game application.

Figure 4:
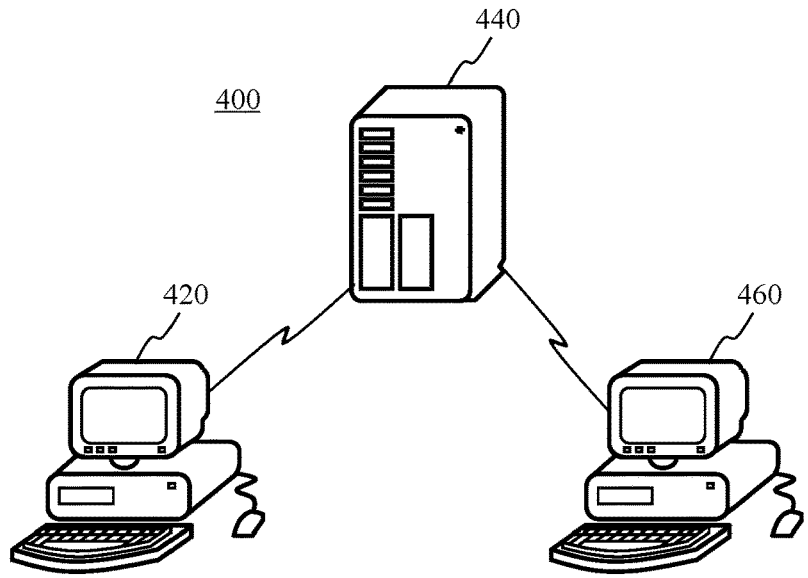
FIG. 4 is a schematic diagram of an implementation environment according to an exemplary embodiment of this application.

FIG. 4 is a structural block diagram of a computer system according to an exemplary embodiment of this application. The computer system 400 includes a first device 420, a server 440, and a second device 460.

An application supporting a virtual environment is installed and run on the first device 420. The application may be any one of a VR application, a 3D map application, a military simulation application, a TPS game, an FPS game, a MOBA game, and a multiplayer shooting survival game. The first device 420 is a device used by a first user. The first user uses the first device 420 to control a first virtual object in the virtual environment to perform an action. The action includes, but is not limited to, at least one of body posture adjustment, crawling, walking, running, cycling, jumping, driving, picking, shooting, attacking, and throwing. For example, the first virtual object is a first virtual character such as a simulated character role or a cartoon character role.

The first device 420 is connected to the server 440 by using a wireless network or a wired network.

The server 440 includes at least one of a single server, a plurality of servers, a cloud computing platform, or a virtualization center. The server 440 is configured to provide a backend service for an application supporting a 3D virtual environment. Optionally, the server 440 takes on primary computing work, the first device 420 and the second device 460 take on secondary computing work; alternatively, the server 440 takes on the secondary computing work, and the first device 420 and the second device 460 take on the primary computing work; alternatively, collaborative computing is performed by using a distributed computing architecture among the server 440, the first device 420, and the second device 460.

An application supporting a virtual environment is installed and run on the second device 460. The application may be any one of a VR application, a 3D map application, a military simulation application, an FPS game, a MOBA game, and a multiplayer shooting survival game. The second device 460 is a device used by a second user. The second user uses the second device 460 to control a second virtual object in a virtual environment to perform an action. The action includes, but is not limited to, at least one of body posture adjustment, crawling, walking, running, cycling, jumping, driving, picking, shooting, attacking, and throwing. For example, the second virtual object is a second virtual character, such as a simulated character role or a cartoon character role.

In some embodiments, the first virtual character and the second virtual character are located in the same virtual environment. In some embodiments, the first virtual character and the second virtual character may belong to the same team or the same organization, have a friend relationship, or have a temporary communication permission. In some embodiments, the first virtual character and the second virtual character may alternatively belong to different teams, different organizations, or two groups hostile to each other.

Optionally, the applications mounted on the first device 420 and the second device 460 are the same, or the applications mounted on the two devices are the same type of applications of different control system platforms. The first device 420 may generally refer to one of a plurality of devices. The second device 460 may generally refer to one of a plurality of devices. The first device 420 and the second device 460 may be the foregoing terminal. In this embodiment, a description is made by using only the first device 420 and the second device 460 as an example. The type of the first device 420 and the type of the second device 460 may be the same or may be different. The device type includes at least one of a game console, a desktop computer, a smartphone, a tablet computer, an eBook reader, an MP3 player, an MP4 player, and a portable laptop computer. In the following embodiments, a description is made by using an example in which the device is a smartphone.

A person skilled in the art may learn that there may be more or fewer devices. For example, there may be only one device, or there may be dozens of or hundreds of or more devices. The quantity and the device type of the device are not limited in the embodiments of this disclosure.

Figure 5:
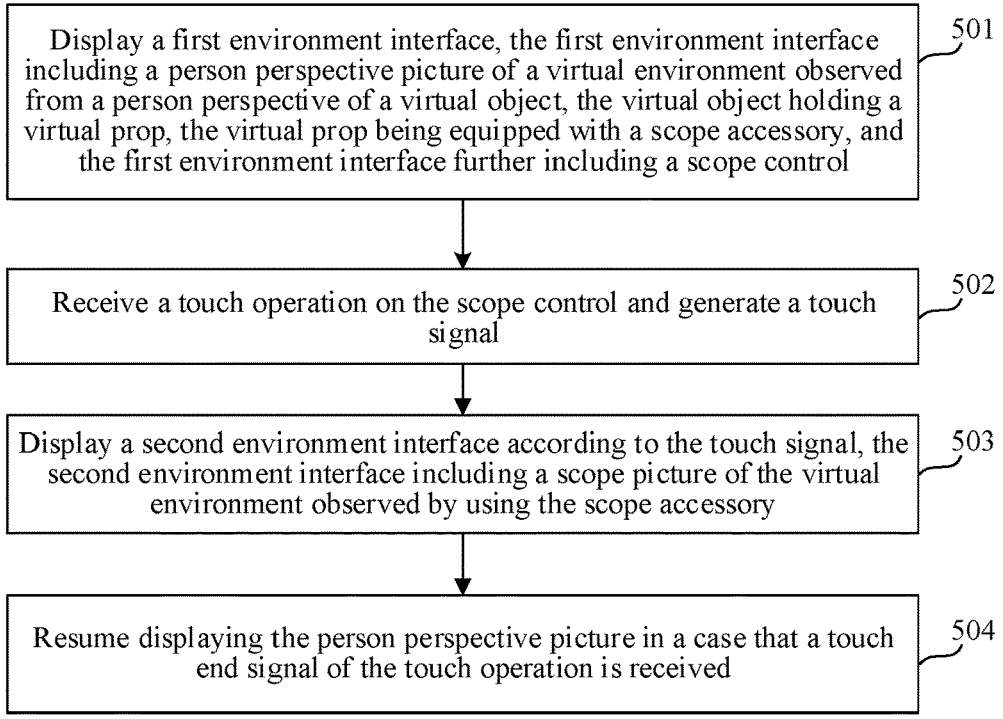
FIG. 5 is a flowchart of a method for application of a scope in a virtual environment according to an exemplary embodiment of this application.

With reference to the foregoing description of the terms and the implementation environment, the method for application of a scope in a virtual environment according to the embodiments of this disclosure is described. A description is made by using an example in which the method is applied to a terminal. As shown in FIG. 5, the method includes the following steps:

Step 501. Display a first environment interface, the first environment interface including a person perspective picture of the virtual environment observed from a person perspective of a virtual object, the virtual object holding a virtual item, the virtual item being equipped with a scope accessory, and the first environment interface further including a scope control.

In some embodiments, the person perspective picture may be a picture displayed from a first-person perspective of the virtual object, or may be a picture displayed from a third-person perspective of the virtual object. The first-person perspective is a perspective corresponding to a picture that can be observed by the virtual object in the virtual environment, which does not include the virtual object, for example, only arms of the virtual object and the virtual item can be observed. The third-person perspective is a perspective used by a camera model for observing the virtual object in the virtual environment, the picture corresponding to the third-person perspective includes the virtual object, and generally, the camera model is located behind the virtual object to observe the virtual object, for example, a 3D model of the virtual object and the virtual item (for example, a virtual gun) held by the virtual object can be observed.

Figure 6:
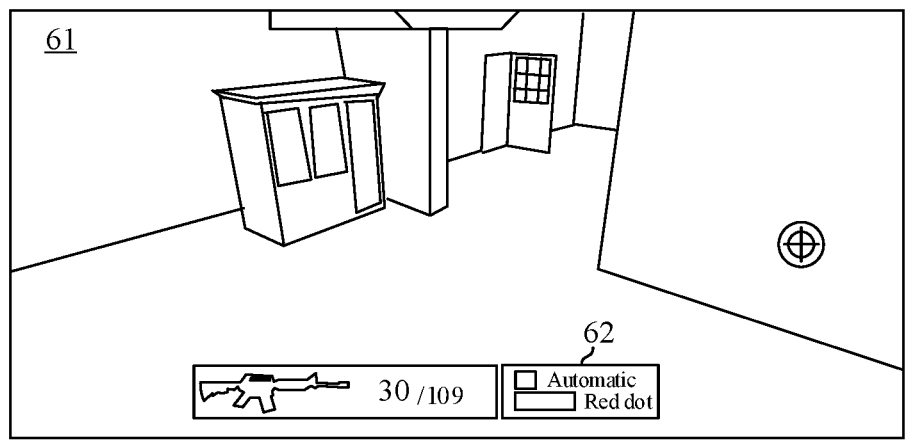
FIG. 6 is a schematic display diagram of a scope accessory according to the embodiment shown in FIG. 5.

In some embodiments, when the person perspective picture is displayed from the first-person perspective or the third-person perspective of the virtual object, the person perspective picture further includes an item status bar, and a scope accessory equipped on the virtual item is displayed in the item status bar. The first-person perspective is used as an example. As shown in FIG. 6, FIG. 6 is a schematic interface diagram of a person perspective picture 61 displayed from the first-person perspective of the virtual object. The person perspective picture 61 includes an item status bar 62, and the item status bar 62 displays a scope accessory "red dot", namely, a red dot scope, equipped on the virtual item.

In some embodiments, when the person perspective picture is displayed from the third-person perspective of the virtual object, the person perspective picture further includes the virtual item, and the equipped scope accessory is displayed on the virtual item.

Step 502. Receive a touch operation on the scope control and generate a touch signal.

In some embodiments, the method is applied to a terminal with a touchscreen. A touch operation performed on the scope control on the touchscreen is received, and a touch signal is generated. The touch signal is a signal generated when the touch operation begins and used for indicating that the touch operation begins.

In some embodiments, a touch operation on the touchscreen is received; first coordinates corresponding to the touch operation on the touchscreen are determined; second coordinates corresponding to a center point of the scope control on the touchscreen are determined; when a distance between the first coordinates and the second coordinates is less than a distance threshold, it is determined that the touch operation is the touch operation performed on the scope control. The distance threshold may be predetermined or configured when the application is running.

In some embodiments, the touchscreen corresponds to a target coordinate system. In the target coordinate system, the first coordinates corresponding to the touch operation are determined, and the second coordinates corresponding to the center point of the scope control are determined. For example, a description is made by using an example in which a point A is used as a point where the touch operation is located and a point B is used as the center point of the scope control. When coordinates of the point A are (x1, y1) and coordinates of the point B are (x2, y2), for a manner of calculating a distance between the point A and the point B, refer to the following formula 1:

$$|AB| = \sqrt{(x_1-x_2)^2 + (x_1-y_2)^2}. \quad \text{Formula 1:}$$

Figure 7:
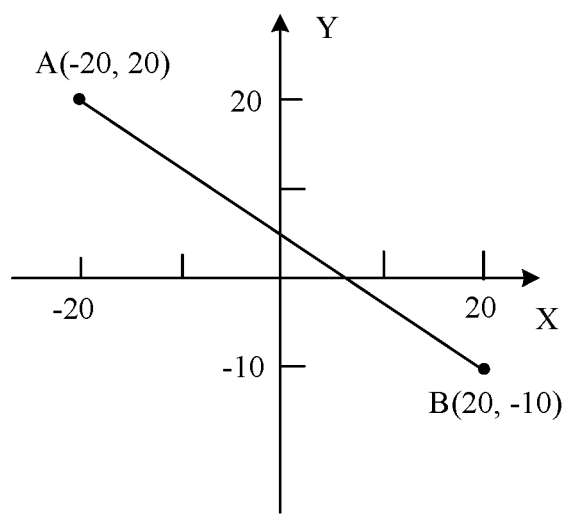
FIG. 7 is a schematic diagram of determining a correspondence between a touch operation and a scope control according to the embodiment shown in FIG. 5.

For example, referring to FIG. 7, when the coordinates of the point A are (−20, 20) and the coordinates of the point B are (20, −10), the distance between A and B is 50. When the required distance is 100, it is determined that the distance between A and B is less than the required distance, that is, the touch operation is the touch operation performed on the scope control.

Step 503. Display a second environment interface according to the touch signal, the second environment interface including a scope picture of the virtual environment observed by using the scope accessory.

In some embodiments, the scope accessory equipped on the virtual item may include at least one of a mechanical scope, a basic scope, a low-power scope, or a high-power scope. The mechanical scope is an original scope equipped on the virtual item, that is, when a scope slot of the virtual item is not equipped with other scopes, the virtual environment may be observed by using the mechanical scope. The basic scope is a scope accessory with no magnification effect in observing the virtual environment, that is, observing the virtual environment at a 1× magnification. Optionally, the basic scope includes at least one of a red dot scope and a holographic scope. The low-power scope is a scope accessory with a low magnification in observing the virtual environment, such as a 2× scope or a 3× scope. The high-power scope is a scope accessory with a high magnification in observing the virtual environment, such as a 4× scope, a 6× scope, an 8× scope, or a 15× scope.

Step 504. Resume displaying the person perspective picture when a touch end signal of the touch operation is received.

In some embodiments, the user presses and holds the scope control on the touchscreen as the touch operation on the scope control. When the user releases the touch on the scope control, the terminal generates the touch end signal.

Based on the above, in the method for application of a scope in a virtual environment according to the embodiments of this disclosure, a scope control is disposed, and according to whether a touch operation on the scope control is continuous (e.g., press and hold), switching is performed between a person perspective picture observed without a scope accessory and a scope picture observed with the scope accessory. Only a single touch on the scope control is required to switch between the person perspective picture and the scope picture, thereby improving the enabling efficiency of the scope accessory, and improving the efficiency and accuracy of observing a virtual environment.

Figure 8:
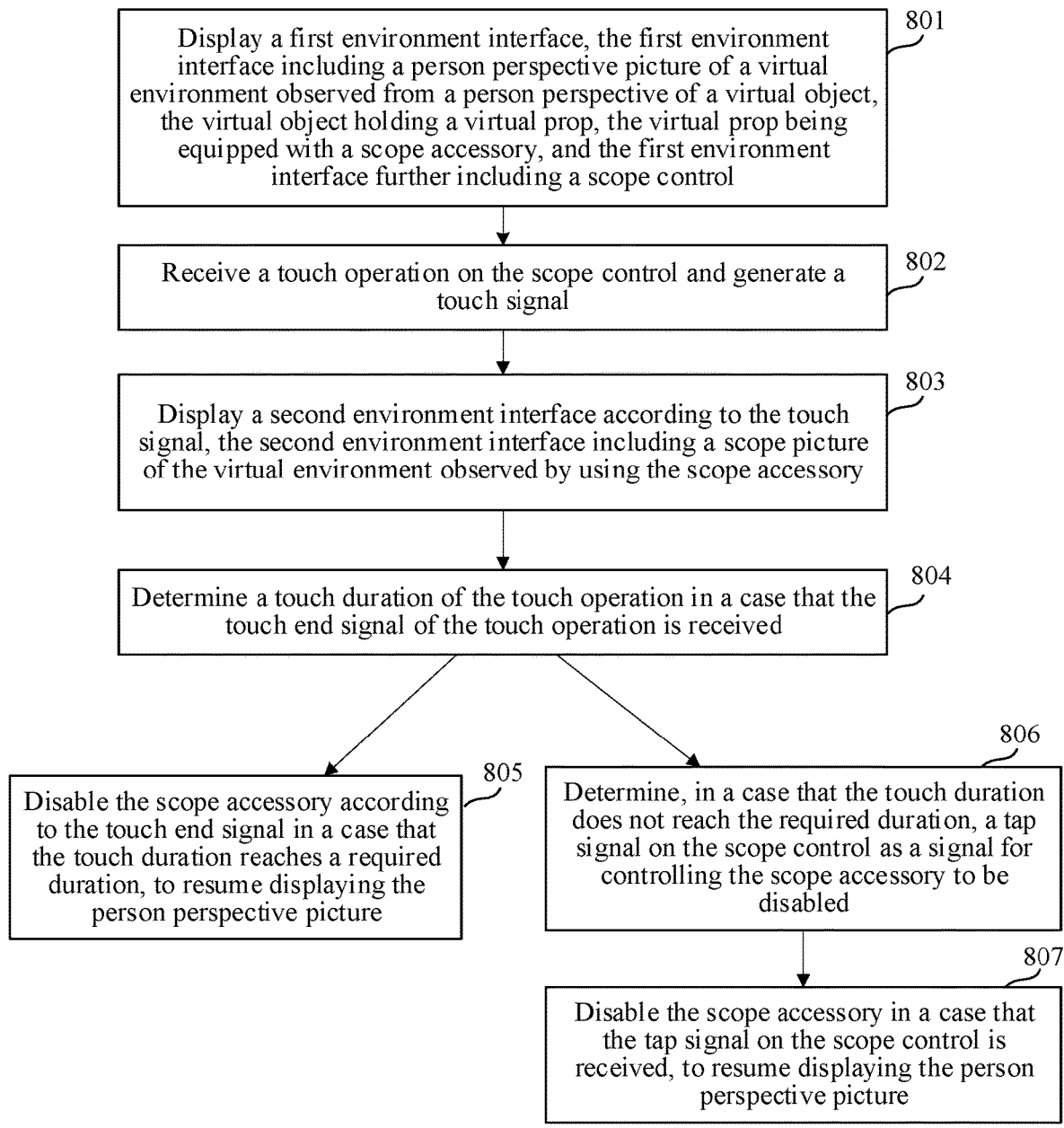
FIG. 8 is a flowchart of a method for application of a scope in a virtual environment according to another exemplary embodiment of this application.

In some embodiments, there are different scope control manners according to whether the touch duration of the touch operation reaches the required touch duration threshold (also referred to as required duration in this disclosure). FIG. 8 is a flowchart of a method for application of a scope in a virtual environment according to another exemplary embodiment of this application. A description is made by using an example in which the method is applied to a terminal. As shown in FIG. 8, the method includes the following steps:

Step 801. Display a first environment interface, the first environment interface including a person perspective picture of the virtual environment observed from a person perspective of a virtual object, the virtual object holding a virtual item, the virtual item being equipped with a scope accessory, and the first environment interface further including a scope control.

In some embodiments, the person perspective picture may be a picture displayed from a first-person perspective of the virtual object, or may be a picture displayed from a third-person perspective of the virtual object.

Step 802. Receive a touch operation on the scope control and generate a touch signal.

In some embodiments, the method is applied to a terminal with a touchscreen. A touch operation performed on the scope control on the touchscreen is received.

In some embodiments, before the touch operation on the scope control is received, a scope control manner may be set in a function setting interface. The scope control manner includes any one of a tapping control manner, a touching-and-holding control manner, and a hybrid control manner. The tapping control manner is a manner of enabling the scope accessory by tapping the scope control and disabling the scope accessory by tapping the scope control. The touching-and-holding control manner is a manner of touching and holding the scope control to enable the scope accessory and disabling the scope accessory when the touch-and-hold operation is ended (i.e., the press on the screen is released). The hybrid control manner is a control manner of selecting one of the tapping control manner and the touching-and-holding control manner by using a required duration as a critical duration.

In some embodiments, the first environment interface further includes a function setting control. The function setting control is configured to enable the function setting interface, a trigger operation on the function setting control is received, and the function setting interface is displayed according to the trigger operation. The function setting interface includes a scope setting option. The scope setting option includes a tapping control option, a touching-and-holding control option, and a hybrid control option. The tapping control option corresponds to the tapping control manner, the touching-and-holding control option corresponds to the touching-and-holding control option, and the hybrid control option corresponds to the hybrid control manner. For example, when an enabling operation on the hybrid control option is received, the hybrid control option is used for instructing to determine a disabling manner of the scope accessory by using the required duration as a critical duration. That is, the critical duration is used as a reference to select the control option between the tapping control option and the touching-and-holding control option.

Step 803. Display a second environment interface according to the touch signal, the second environment interface including a scope picture of the virtual environment observed by using the scope accessory.

Optionally, the scope accessory equipped on the virtual item may be at least one of a mechanical scope, a basic scope, a low-power scope, and a high-power scope.

Step 804. Determine a touch duration of the touch operation in a case that the touch end signal of the touch operation is received. For example, the touch end signal may be generated when a user release the touch operation.

Step 805. Disable the scope accessory according to the touch end signal in a case that the touch duration reaches a required duration, to resume displaying the person perspective picture.

In some embodiments, when the touch duration of the touch operation reaches the required duration but the touch end signal is not received, the touching-and-holding control manner is determined as a control manner of the scope accessory. When the touch operation on the scope control is ended (i.e., the touch is released), the scope control is disabled.

In some embodiments, the required duration is a preset duration. For example, the required duration is one second. When the touch duration of the touch operation reaches one second but the touch end signal is not received, the touch end signal is determined as a signal for controlling the scope accessory to be disabled.

Step 806. Determine, in a case that the touch duration does not reach the required duration, a tap signal on the scope control as a signal for controlling the scope accessory to be disabled.

Optionally, when the touch duration of the touch operation does not reach the required duration and the touch end signal is received, the touch operation may be considered as a tap operation.

Step 807. Disable the scope accessory in a case that the tap signal on the scope control is received, to resume displaying the person perspective picture.

Figure 9:
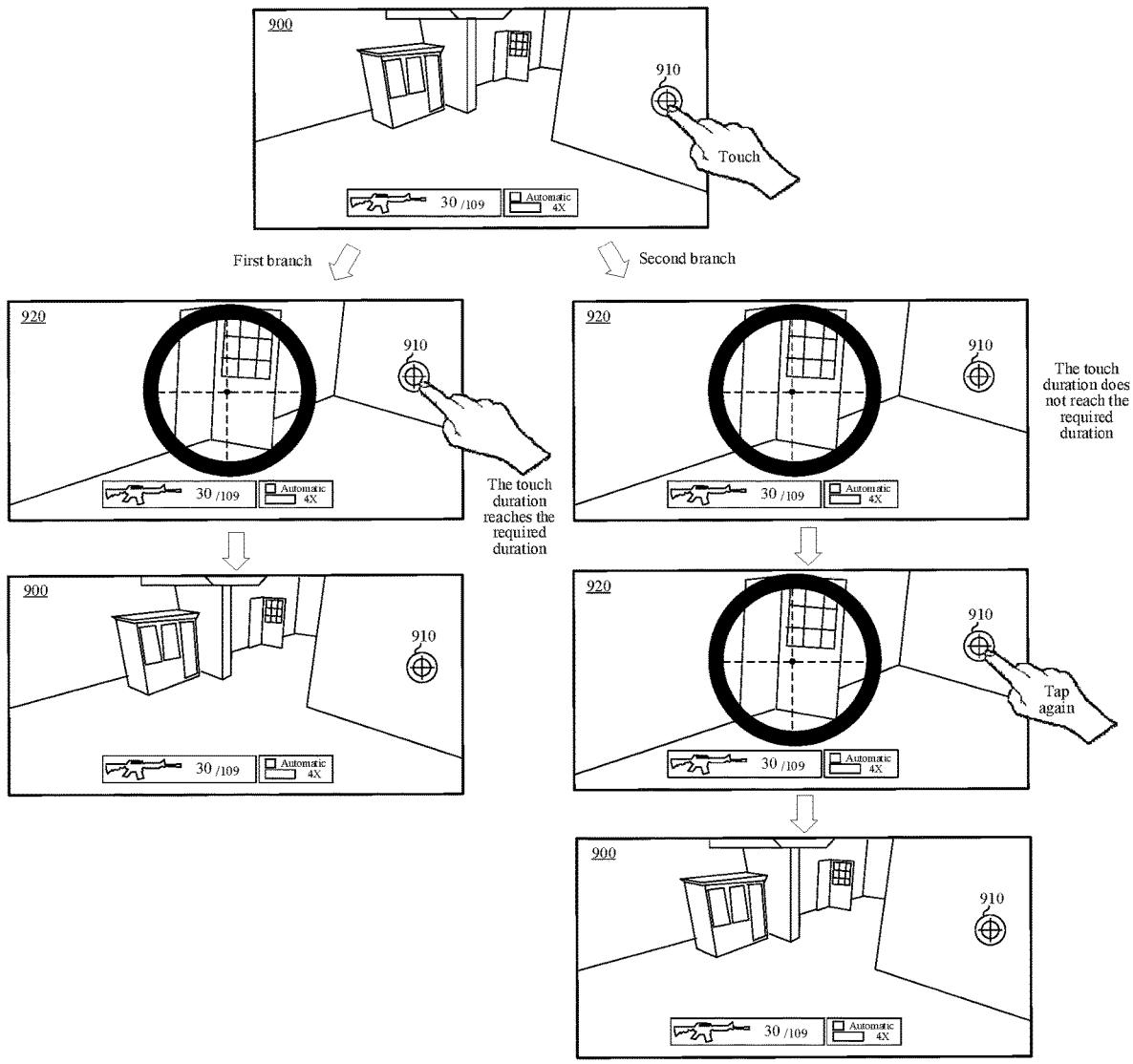
FIG. 9 is a schematic interface diagram corresponding to a hybrid control manner according to the embodiment shown in FIG. 8.

For example, referring to FIG. 9, a person perspective picture 900 of a virtual environment observed from a first-person perspective of a virtual object is displayed in a first environment interface. A scope control 910 is superimposed and displayed on the person perspective picture 900. In a first branch, a user performs a touch operation on the scope control 910, a scope picture 920 is displayed according to the touch operation, and a touch duration of the touch operation reaches a required duration. When the touch operation ends, displaying the person perspective picture 900 is resumed. In a second branch, a user performs a touch operation on the scope control 910, a scope picture 920 is displayed according to the touch operation, and the touch operation is ended before the touch duration reaches the required duration. When a further tap operation on the scope control 910 is received, displaying the person perspective picture 900 is resumed. Picture content of the person perspective picture 900 may be changed content, or may be unchanged content.

Figure 10:
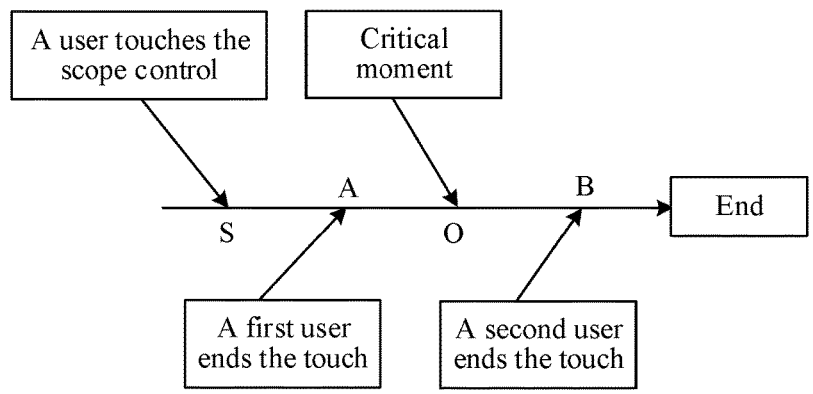
FIG. 10 is a schematic diagram of a time line corresponding to the hybrid control manner according to the embodiment shown in FIG. 8.

For example, referring to FIG. 10, on a time line, a time point S is a moment at which a first user or a second touches the scope control, a time point A is a moment at which a first user ends the touch (i.e., releases the touch), a time point B is a moment at which a second user ends the touch, and a time point O is a critical moment corresponding to the required duration. Depending on the touch releasing time, the first user needs to tap the scope control again to disable the scope accessory after enabling the scope accessory, and the second user disables the scope accessory when the touch is released at the time point B.

Based on the above, in the method for application of a scope in a virtual environment according to the embodiments of this disclosure, a scope control is disposed, and a corresponding start signal and end signal are determined according to whether a touch operation on the scope control is continuous. In this way, only a single touch on the scope control is required to switch between a person perspective picture observed without a scope accessory and a scope picture observed with the scope accessory, thereby improving the enabling efficiency of the scope accessory, and improving the efficiency and accuracy of observing a virtual environment.

According to the method provided in this embodiment, the required duration is set, and the required duration is used as the critical duration of the tapping control manner and the touching-and-holding control manner, so that the user can determine the control manner of the scope accessory through a single touch operation, which improves the control efficiency.

Figure 11:
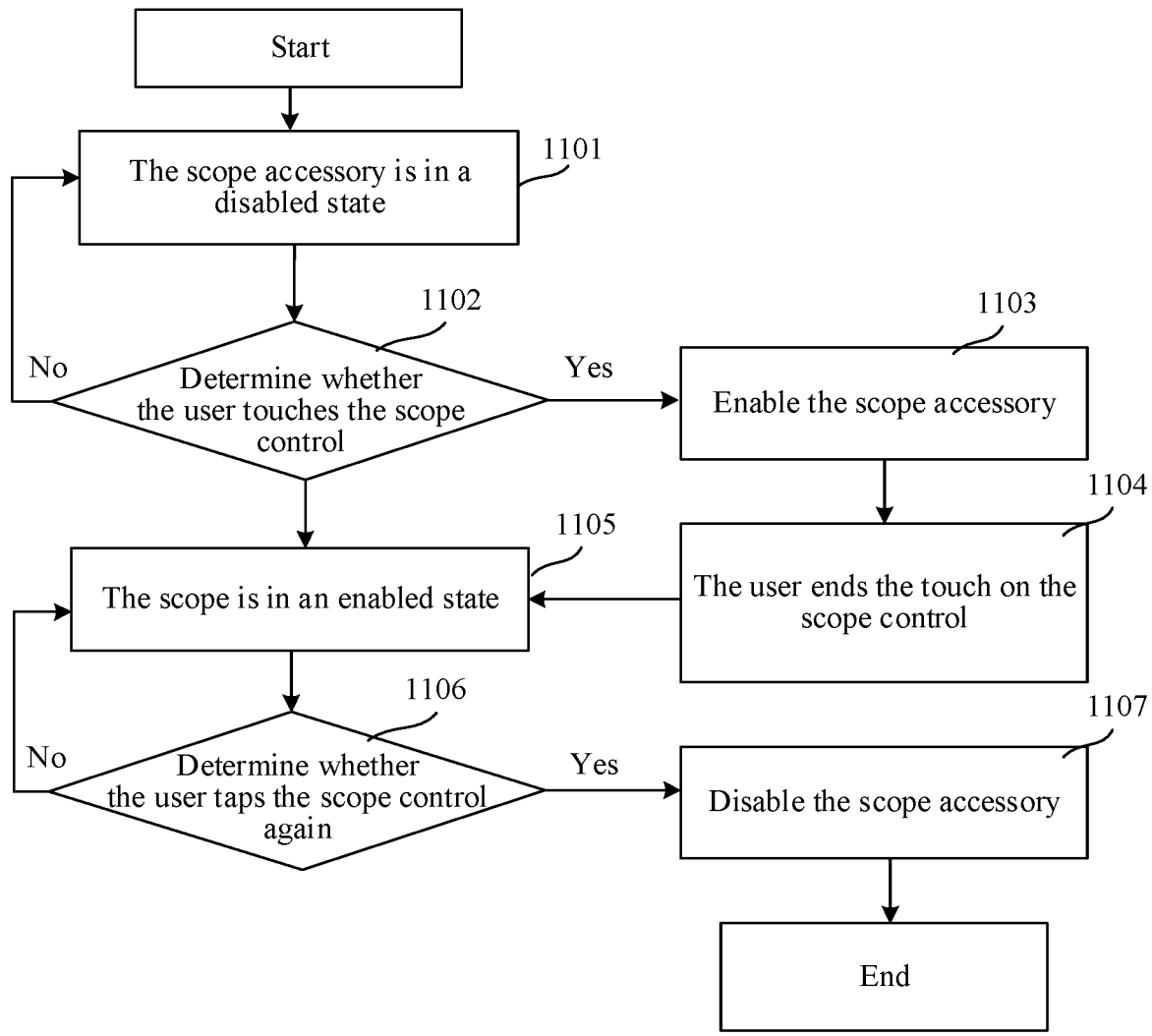
FIG. 11 is a flowchart corresponding to a tapping control manner according to an exemplary embodiment of this application.

For example, the tapping control manner, the touching-and-holding control manner, and the hybrid control manner are respectively described with reference to drawings:

First, refer to FIG. 11 for an implementation process of the tapping control manner. The process includes the following steps:

Step 1101. The scope accessory is in a disabled state. Optionally, the environment interface displayed on the terminal includes a picture of the virtual environment observed from the first-person perspective or the third-person perspective of the virtual object. Step 1102. Determine whether the user touches the scope control. Step 1103. Enable the scope accessory when the user touches the scope control. Optionally, after the scope accessory is enabled, the virtual environment is observed by using the scope accessory. Step 1104. The user ends the touch on the scope control. Step 1105. The scope is in an enabled state. Step 1106. Determine whether the user taps the scope control again. Step 1107. Disable the scope accessory when the user taps the scope control again.

Figure 12:
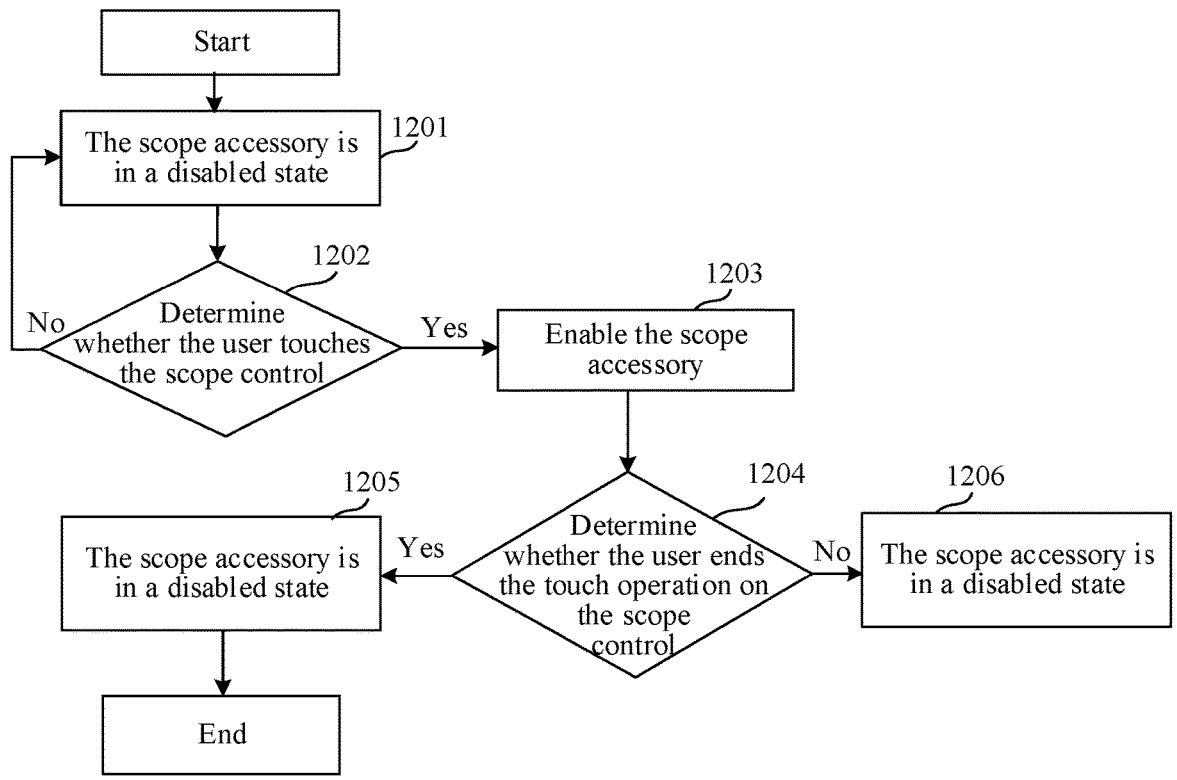
FIG. 12 is a flowchart corresponding to a touching-and-holding control manner according to an exemplary embodiment of this application.

Second, refer to FIG. 12 for an implementation process of the touching-and-holding control manner. The process includes the following steps:

Step 1201. The scope accessory is in a disabled state. Optionally, the environment interface displayed on the terminal includes a picture of the virtual environment observed from the first-person perspective or the third-person perspective of the virtual object. Step 1202. Determine whether the user touches the scope control. Step 1203. Enable the scope accessory when the user touches the scope control. Optionally, after the scope accessory is enabled, the virtual environment is observed by using the scope accessory. Step 1204. Determine whether the user ends the touch operation on the scope control. Step 1205. Disable the scope accessory when the user ends the touch operation on the scope control. Step 1206. Keep the scope accessory enabled before the user ends the touch operation on the scope control.

Figure 13:
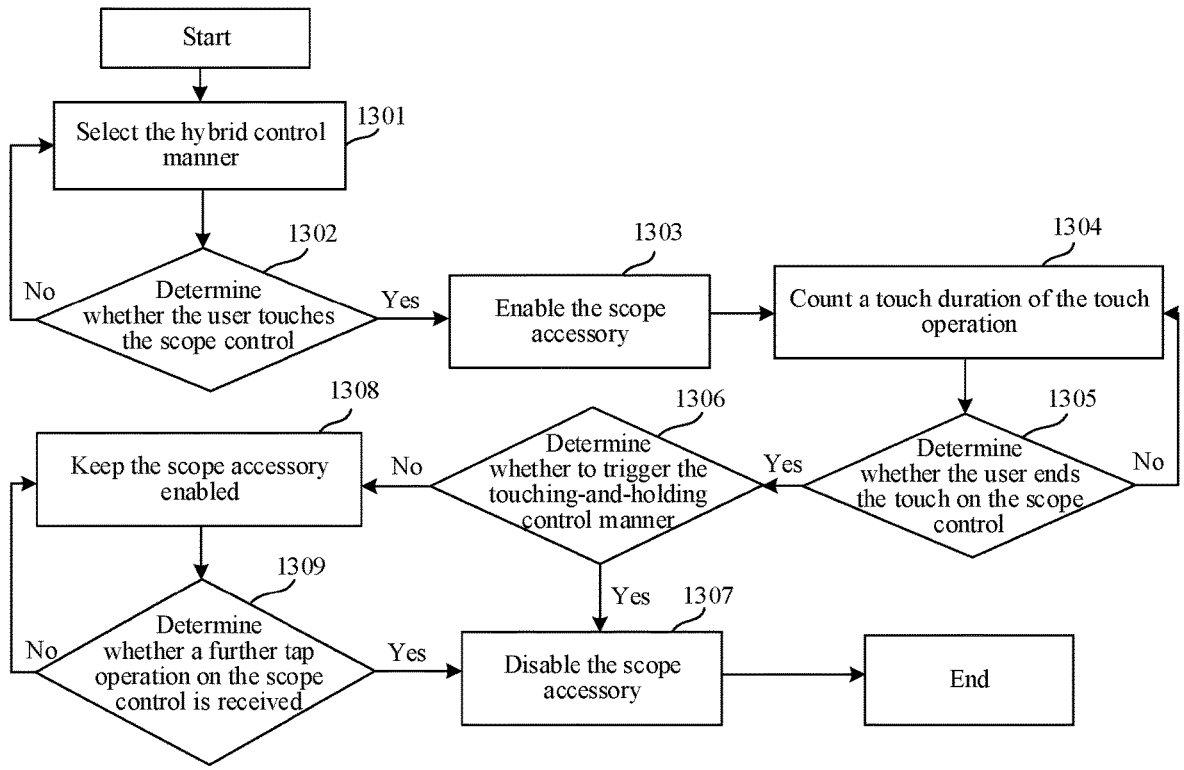
FIG. 13 is a flowchart corresponding to a hybrid control manner according to an exemplary embodiment of this application.

Third, refer to FIG. 13 for an implementation process of the hybrid control manner. The process includes the following steps:

Step 1301. Select the hybrid control manner. Step 1302. Determine whether the user touches the scope control. Step 1303. Enable the scope accessory when the user touches the scope control. Step 1304. Count a touch duration of the touch operation. Step 1305. Determine whether the user ends the touch on the scope control. Step 1306. Determine whether to trigger the touching-and-holding control manner when the user ends the touch on the scope control. Step 1307. Disable the scope accessory when the touching-and-holding control manner is triggered. Step 1308. Keep the scope accessory enabled when the touching-and-holding control manner is not triggered. Step 1309. Determine whether a further tap operation on the scope control is received. Optionally, when a further tap operation on the scope control is received, the scope accessory is disabled.

Figure 14:
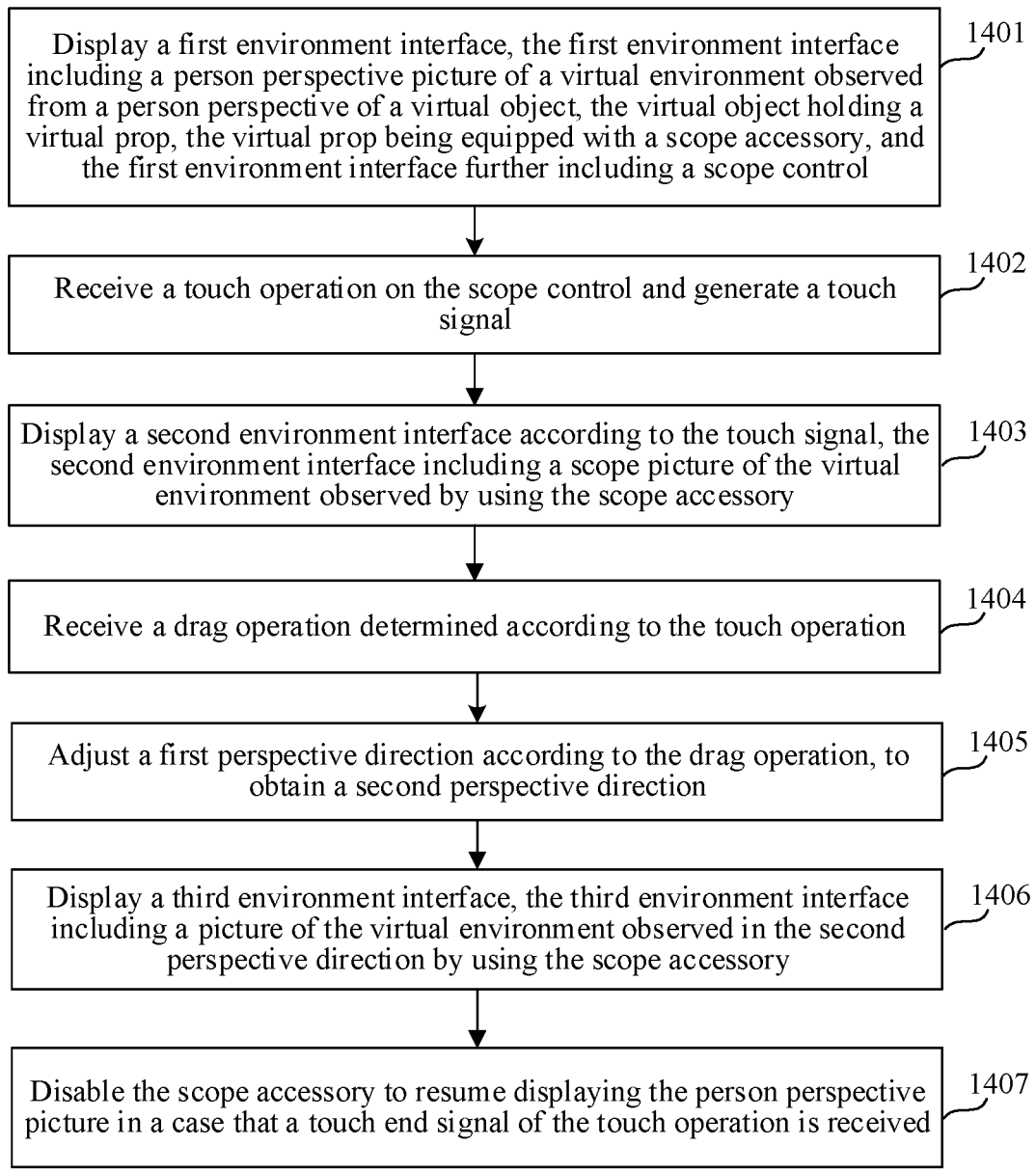
FIG. 14 is a flowchart of a method for application of a scope in a virtual environment according to another exemplary embodiment of this application.

In an optional embodiment, after the scope accessory is enabled, when the virtual environment is observed by using a scope, a perspective direction may be adjusted through a drag operation. FIG. 14 is a flowchart of a method for application of a scope in a virtual environment according to another exemplary embodiment of this application. A description is made by using an example in which the method is applied to a terminal. As shown in FIG. 14, the method includes the following steps:

Step 1401. Display a first environment interface, the first environment interface including a person perspective picture of the virtual environment observed from a person perspective of a virtual object, the virtual object holding a virtual item, the virtual item being equipped with a scope accessory, and the first environment interface further including a scope control.

Optionally, the person perspective picture may be a picture displayed from a first-person perspective of the virtual object, or may be a picture displayed from a third-person perspective of the virtual object.

Step 1402. Receive a touch operation on the scope control and generate a touch signal.

Optionally, the method is applied to a terminal with a touchscreen. A touch operation performed on the scope control on the touchscreen is received.

Optionally, before the touch operation on the scope control is received, a scope control manner may be set in a function setting interface. The scope control manner includes any one of a tapping control manner, a touching-and-holding control manner, and a hybrid control manner. Optionally, the tapping control manner is a manner of enabling the scope accessory by tapping the scope control and disabling the scope accessory by tapping the scope control. The touching-and-holding control manner is a manner of touching and holding the scope control to enable the scope accessory and disabling the scope accessory when the touch-and-hold operation is ended. The hybrid control manner is a control manner of selecting one of the tapping control manner and the touching-and-holding control manner by using a required duration as a critical duration.

Optionally, the first environment interface further includes a function setting control. The function setting control is configured to enable the function setting interface, a trigger operation on the function setting control is received, and the function setting interface is displayed according to the trigger operation. The function setting interface includes a scope setting option. The scope setting option includes a tapping control option, a touching-and-holding control option, and a hybrid control option. The tapping control option corresponds to the tapping control manner, the touching-and-holding control option corresponds to the touching-and-holding control option, and the hybrid control option corresponds to the hybrid control manner. Optionally, an enabling operation on the hybrid control option is received, the hybrid control option being used for instructing to determine a disabling manner of the scope accessory by using the required duration as a critical duration.

Step 1403. Display a second environment interface according to the touch signal, the second environment interface including a scope picture of the virtual environment observed by using the scope accessory.

Optionally, the scope accessory equipped on the virtual item may be at least one of a mechanical scope, a basic scope, a low-power scope, and a high-power scope.

Optionally, the scope picture is a picture of the virtual environment observed in a first perspective direction by using the scope accessory.

Step 1404. Receive a drag operation determined according to the touch operation.

Optionally, after the touch operation is received, a drag operation connected to the touch operation is received before the touch operation is ended.

Step 1405. Adjust the first perspective direction according to the drag operation, to obtain a second perspective direction.

Optionally, the first perspective direction is a perspective direction for a camera model to observe the virtual environment in the form of the scope accessory. According to a drag direction and a drag distance of the drag operation, the camera model is correspondingly rotated in the virtual environment, and a perspective direction after the rotation is used as the second perspective direction. Optionally, the second perspective direction is also a perspective direction for the camera model to observe the virtual environment in the form of the scope accessory.

Optionally, when the virtual environment is not observed by using the scope accessory, a speed at which the perspective direction is adjusted is a first adjustment speed. The first perspective direction is adjusted at a second adjustment speed according to the drag operation, to obtain a second perspective direction. The second adjustment speed is less than the first adjustment speed.

Step 1406. Display a third environment interface, the third environment interface including a picture of the virtual environment observed in the second perspective direction by using the scope accessory.

Step 1407. Disable the scope accessory to resume displaying the person perspective picture in a case that a touch end signal of the touch operation is received.

Optionally, the user touches the scope control on the touchscreen as the touch operation on the scope control. When the user releases the touch on the scope control, the terminal generates the touch end signal.

Based on the above, in the method for application of a scope in a virtual environment according to the embodiments of this disclosure, a scope control is disposed, and according to whether a touch operation on the scope control is continuous, switching is performed between a person perspective picture observed without a scope accessory and a scope picture observed with the scope accessory. Only a single touch on the scope control is required to switch between the person perspective picture and the scope picture, thereby improving the enabling efficiency of the scope accessory, and improving the efficiency and accuracy of observing a virtual environment.

According to the method provided in this embodiment, when the scope accessory is enabled and the virtual environment is observed by using the scope accessory, the perspective direction of the virtual environment observed is adjusted by receiving the drag operation connected to the touch operation. In this way, the operations of enabling the scope accessory, adjusting the perspective direction, and disabling the scope accessory are implemented in a single touch event, thereby improving the application efficiency of the scope accessory.

Figure 15:
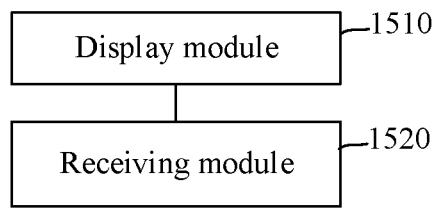
FIG. 15 is a structural block diagram of an apparatus for application of a scope in a virtual environment according to an exemplary embodiment of this application.

FIG. 15 is a structural block diagram of an apparatus for application of a scope in a virtual environment according to an exemplary embodiment of this application. A description is made by using an example in which the apparatus is disposed in a terminal. As shown in FIG. 15, the apparatus includes a display module 1510 and a receiving module 1520.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The display module 1510 is configured to display a first environment interface, the first environment interface including a person perspective picture of the virtual environment observed from a person perspective of a virtual object, the virtual object holding a virtual item, the virtual item being equipped with a scope accessory, and the first environment interface further including a scope control.

The receiving module 1520 is configured to receive a touch operation on the scope control and generate a touch signal.

The display module 1510 is further configured to display a second environment interface according to the touch signal, the second environment interface including a scope picture of the virtual environment observed by using the scope accessory.

The display module 1510 is further configured to resume displaying the person perspective picture in a case that a touch end signal of the touch operation is received.

In an optional embodiment, the receiving module 1520 is further configured to determine a touch duration of the touch operation in a case that the touch end signal of the touch operation is received; and disable the scope accessory according to the touch end signal in a case that the touch duration reaches a required duration, to resume displaying the person perspective picture.

Figure 16:
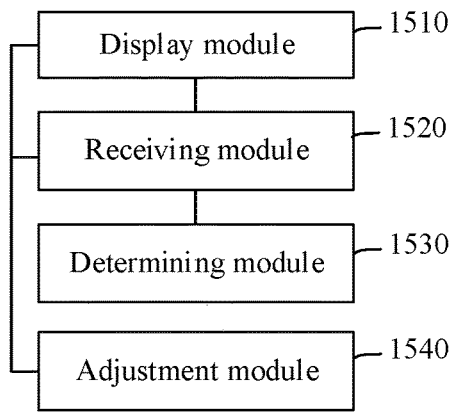
FIG. 16 is a structural block diagram of an apparatus for application of a scope in a virtual environment according to another exemplary embodiment of this application.

In an optional embodiment, as shown in FIG. 16, the apparatus further includes:
  a determining module 1530, configured to determine, in a case that the touch duration does not reach the required duration, a tap signal on the scope control as a signal for controlling the scope accessory to be disabled.

The receiving module 1520 is further configured to disable the scope accessory in a case that the tap signal on the scope control is received.

The display module 1510 is further configured to resume displaying the person perspective picture.

In an optional embodiment, the receiving module 1520 is further configured to receive a trigger operation on a function setting control;
  the display module 1510 is further configured to display a function setting interface according to the trigger operation, the function setting interface including a scope setting option, the scope setting option including a hybrid control option; and the receiving module 1520 is further configured to receive an enabling operation on the hybrid control option, the hybrid control option being used for instructing to determine a disabling manner of the scope accessory by using the required duration as a critical duration.

In an optional embodiment, the scope picture is a picture of the virtual environment observed in a first perspective direction by using the scope accessory;

the receiving module 1520 is further configured to receive a drag operation determined according to the touch operation; and the apparatus further includes:

an adjustment module 1540, configured to adjust the first perspective direction according to the drag operation, to obtain a second perspective direction.

The display module 1510 is further configured to display a third environment interface, the third environment interface including a picture of the virtual environment observed in the second perspective direction by using the scope accessory.

In an optional embodiment, the virtual environment is not observed by using the scope accessory, a speed at which a perspective direction is adjusted is a first adjustment speed.

The adjustment module 1540 is further configured to adjust the first perspective direction at a second adjustment speed according to the drag operation, the second adjustment speed being less than the first adjustment speed.

In an optional embodiment, the receiving module 1520 is further configured to receive a touch operation on a touchscreen; and the apparatus further includes:

a determining module 1530, configured to determine first coordinates corresponding to the touch operation on the touchscreen; determine second coordinates corresponding to a center point of the scope control on the touchscreen; and determine, in a case that a distance between the first coordinates and the second coordinates is less than a required distance, that the touch operation is the touch operation performed on the scope control.

Based on the above, in the apparatus for application of a scope in a virtual environment according to the embodiments of this disclosure, a scope control is disposed, and a corresponding touch signal and touch end signal are determined according to whether a touch operation on the scope control is continuous. In this way, only a single touch on the scope control is required to switch between a person perspective picture observed without a scope accessory and a scope picture observed with the scope accessory, thereby improving the enabling efficiency of the scope accessory, and improving the efficiency and accuracy of observing a virtual environment.

The apparatus for application of a scope in a virtual environment according to the foregoing embodiment is illustrated only with an example of division of the foregoing functional modules. In actual application, the functions may be allocated to and completed by different functional modules according to requirements, that is, the internal structure of the device is divided into different functional modules, to implement all or some of the functions described above. In addition, the apparatus for application of a scope in a virtual environment according to the foregoing embodiment belong to the same conception as the embodiments of the method for application of a scope in a virtual environment. For the specific implementation process, refer to the method embodiments. Details are not described herein again.

Figure 17:
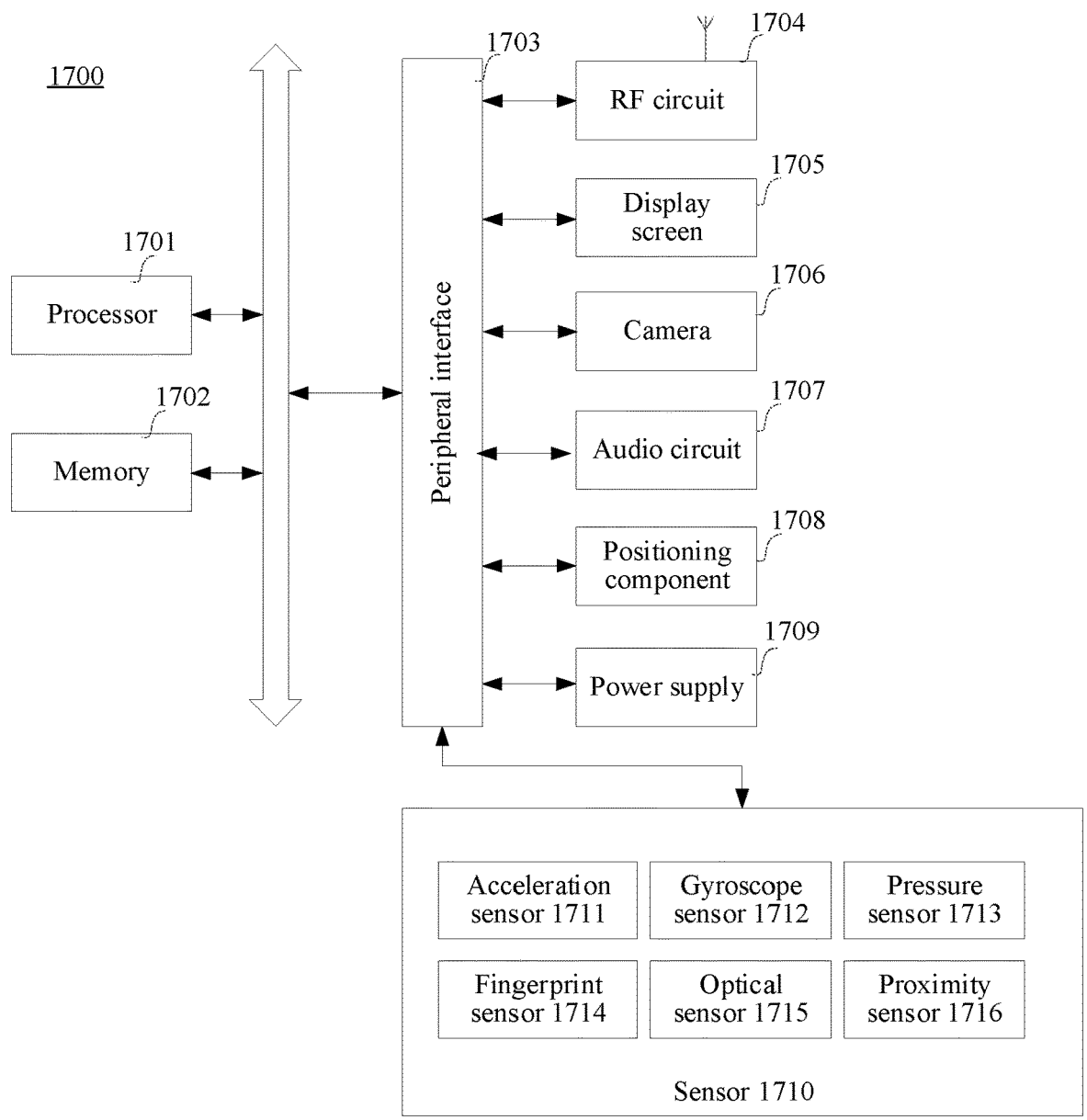
FIG. 17 is a structural block diagram of a terminal according to an exemplary embodiment of this application.

FIG. 17 is a structural block diagram of a terminal 1700 according to an exemplary embodiment of this application. The terminal 1700 may be a smartphone, a tablet computer, an MP3 player, an MP4 player, a notebook computer, or a desktop computer. The terminal 1700 may also be referred to as user equipment, a portable terminal, a laptop terminal, or a desktop terminal, among other names.

Generally, the terminal 1700 includes a processor 1701 and a memory 1702.

The processor 1701 may include one or more processing cores, for example, a 4-core processor or an 8-core processor. The processor 1701 may be implemented in at least one hardware form of a digital signal processor (DSP), a field-programmable gate array (FPGA), and a programmable logic array (PLA). The processor 1701 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1701 may be integrated with a graphics processing unit (GPU). The GPU is configured to be responsible for rendering and drawing content to be displayed by a display screen. In some embodiments, the processor 1701 may further include an artificial intelligence (AI) processor. The AI processor is configured to process computing operations related to machine learning.

The memory 1702 may include one or more computer-readable storage media that may be non-transitory. The memory 1702 may further include a high-speed random access memory (RAM) and a nonvolatile memory, for example, one or more disk storage devices or flash storage devices. In some embodiments, the non-transitory computer-readable storage medium in the memory 1702 is configured to store at least one instruction, and the at least one instruction is configured to be executed by the processor 1701 to implement the method for application of a scope in a virtual environment according to the method embodiments of this disclosure.

In some embodiments, the terminal 1700 may optionally include a peripheral interface 1703 and at least one peripheral. The processor 1701, the memory 1702, and the peripheral interface 1703 may be connected through a bus or a signal cable. Each peripheral may be connected to the peripheral interface 1703 through a bus, a signal cable, or a circuit board. Specifically, the peripheral device includes: at least one of a radio frequency (RF) circuit 1704, a touchscreen 1705, a camera component 1706, an audio circuit 1707, a positioning component 1708, and a power supply 1709.

The peripheral interface 1703 may be configured to connect at least one peripheral related to input/output (I/O) to the processor 1701 and the memory 1702. In some embodiments, the processor 1701, the memory 1702, and the peripheral interface 1703 are integrated on the same chip or the same circuit board. In some other embodiments, any or two of the processor 1701, the memory 1702, and the peripheral interface 1703 may be implemented on an independent chip or circuit board. This is not limited in this embodiment.

The radio frequency circuit 1704 is configured to receive and transmit a radio frequency (RF) signal, which is also referred to as an electromagnetic signal. The RF circuit 1704 communicates with a communication network and another communication device by using the electromagnetic signal. The RF circuit 1704 converts an electric signal into an electromagnetic signal for transmission, or converts a received electromagnetic signal into an electric signal. Optionally, the radio frequency circuit 1704 includes an antenna system, an RF transceiver, one or more amplifiers, a tuner, an oscillator, a digital signal processor, a codec chip set, a subscriber identity module card, and the like. The RF circuit 1704 may communicate with another terminal by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1704 may further include a circuit related to near field communication (NFC), which is not limited in this application.

The display screen 1705 is configured to display a user interface (UI). The UI may include a graph, a text, an icon, a video, and any combination thereof. When the display screen 1705 is a touchscreen, the display screen 1705 is also capable of capturing a touch signal on or above a surface of the display screen 1705. The touch signal may be used as a control signal to be inputted to the processor 1701 for processing. In this case, the display screen 1705 may be further configured to provide a virtual button and/or a virtual keyboard that are/is also referred to as a soft button and/or a soft keyboard. In some embodiments, there may be one display screen 1705, disposed on a front panel of the terminal 1700. In some other embodiments, there may be at least two display screens 1705, respectively disposed on different surfaces of the terminal 1700 or designed in a foldable shape. In still some other embodiments, the display screen 1705 may be a flexible display screen, disposed on a curved surface or a folded surface of the terminal 1700. Even, the display screen 1705 may be further set in a non-rectangular irregular pattern, namely, a special-shaped screen. The display screen 1705 may be prepared by using materials such as a liquid crystal display (LCD), an organic light-emitting diode (OLED), or the like.

The camera 1706 is configured to acquire an image or a video. Optionally, the camera 1706 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and VR shooting functions through fusion of the main camera and wide-angle camera, or another fusion shooting function. In some embodiments, the camera 1706 may further include a flash. The flash may be a single-color-temperature flash, or may be a double-color-temperature flash. The double-color-temperature flash refers to a combination of a warm-light flash and a cold-light flash, and may be used for light compensation under different color temperatures.

The audio circuit 1707 may include a microphone and a speaker. The microphone is configured to acquire sound waves of users and surroundings, and convert the sound waves into electrical signals and input the signals to the processor 1701 for processing, or input the signals to the RF circuit 1704 to implement voice communication. For the purpose of stereo acquisition or noise reduction, there may be a plurality of microphones, respectively disposed at different portions of the terminal 1700. The microphone may further be an array microphone or an omni-directional acquisition type microphone. The speaker is configured to convert electric signals from the processor 1701 or the RF circuit 1704 into sound waves. The speaker may be a conventional thin-film speaker or a piezoelectric ceramic speaker. When the speaker is the piezoelectric ceramic speaker, electric signals not only may be converted into sound waves that can be heard by human, but also may be converted into sound waves that cannot be heard by human for ranging and the like. In some embodiments, the audio circuit 1707 may further include an earphone jack.

The positioning component 1708 is configured to determine a current geographic location of the terminal 1700, to implement a navigation or a location based service (LBS). The positioning component 1708 may be a positioning component based on the Global Positioning System (GPS) of the United States, the China's Beidou Navigation Satellite System (BDS), or the Galileo system of Russia.

The power supply 1709 is configured to supply power to components in the terminal 1700. The power supply 1709 may be an alternating current, a direct current, a primary battery, or a rechargeable battery. When the power supply 1709 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charge technology.

In some embodiments, the terminal 1700 further includes one or more sensors 1710. The one or more sensors 1710 include, but are not limited to, an acceleration sensor 1711, a gyroscope sensor 1712, a pressure sensor 1713, a fingerprint sensor 1714, an optical sensor 1715, and a proximity sensor 1716.

The acceleration sensor 1711 may detect a magnitude of acceleration on three coordinate axes of a coordinate system established with the terminal 1700. For example, the acceleration sensor 1711 may be configured to detect components of gravity acceleration on the three coordinate axes. The processor 1701 may control, according to the gravity acceleration signal collected by the acceleration sensor 1711, the touchscreen 1705 to display in a UI using a horizontal view or a longitudinal view. The acceleration sensor 1711 may be further configured to acquire motion data of a game or a user.

The gyroscope sensor 1712 may detect a body direction and a rotation angle of the terminal 1700. The gyroscope sensor 1712 may cooperate with the acceleration sensor 1711 to acquire a 3D action by the user on the terminal 1700. The processor 1701 may implement the following functions according to the data acquired by the gyroscope sensor 1712: motion sensing (such as changing the UI according to a tilt operation of the user), image stabilization at shooting, game control, and inertial navigation.

The pressure sensor 1713 may be disposed at a side frame of the terminal 1700 and/or a lower layer of the touchscreen 1705. When the pressure sensor 1713 is disposed at the side frame of the terminal 1700, a holding signal of the user on the terminal 1700 may be detected. The processor 1701 performs left/right hand recognition or a quick operation according to the holding signal collected by the pressure sensor 1713. When the pressure sensor 1713 is disposed on the lower layer of the touchscreen 1705, the processor 1701 controls, according to a pressure operation of the user on the touchscreen 1705, an operable control in the UI. The operable control includes at least one of a button control, a scroll-bar control, an icon control, and a menu control.

The fingerprint sensor 1714 is configured to acquire a user's fingerprint, and the processor 1701 identifies a user's identity according to the fingerprint acquired by the fingerprint sensor 1714, or the fingerprint sensor 1714 identifies a user's identity according to the acquired fingerprint. When identifying that the identity of the user is a trusted identity, the processor 1701 authorizes the user to perform related sensitive operations. The sensitive operations include: unlocking a screen, viewing encrypted information, downloading software, paying, changing a setting, and the like. The fingerprint sensor 1714 may be disposed on a front surface, a back surface, or a side surface of the terminal 1700. When a physical button or a vendor logo is disposed on the terminal 1700, the fingerprint sensor 1714 may be integrated with the physical button or the vendor logo.

The optical sensor 1715 is configured to acquire ambient light intensity. In an embodiment, the processor 1701 may control display brightness of the touchscreen 1705 according to the ambient light intensity acquired by the optical sensor 1715. Specifically, when the ambient light intensity is relatively high, the display luminance of the touchscreen 1705 is increased. When the ambient light intensity is relatively low, the display luminance of the touchscreen 1705 is reduced. In another embodiment, the processor 1701 may further dynamically adjust a camera parameter of the camera 1706 according to the ambient light intensity acquired by the optical sensor 1715.

The proximity sensor 1716, also referred to as a distance sensor, is usually disposed on the front panel of the terminal 1700. The proximity sensor 1716 is configured to acquire a distance between the user and the front surface of the terminal 1700. In an embodiment, when the proximity sensor 1716 detects that the distance between the user and the front surface of the terminal 1700 gradually becomes smaller, the touchscreen 1705 is controlled by the processor 1701 to switch from a screen-on state to a screen-off state. In a case that the proximity sensor 1716 detects that the distance between the user and the front surface of the terminal 1700 gradually becomes larger, the touchscreen 1705 is controlled by the processor 1701 to switch from the screen-off state to the screen-on state.

A person skilled in the art may understand that a structure shown in FIG. 17 constitutes no limitation on the terminal 1700, and the terminal may include more or fewer components than those shown in the figure, or combine some components, or use a different component deployment.

An embodiment of this application further provides a computer device, including a memory and a processor, the memory storing at least one instruction, at least one program, a code set, or an instruction set, and the at least one instruction, the at least one program, the code set, or the instruction set being loaded by the processor to implement the method for application of a scope in a virtual environment according to the foregoing embodiments of this disclosure.

An embodiment of this application further provides a non-transitory storage medium, configured to store a computer program, the computer program being configured to perform the method for application of a scope in a virtual environment according to the foregoing embodiments of this disclosure.

This application further provides a computer program product, the computer program product, when run on a computer, causing the computer to perform the method for application of a scope in a virtual environment according to the foregoing method embodiments.

A person of ordinary skill in the art may understand that all or some of the steps of the methods in the embodiments may be implemented by a program instructing relevant hardware. The program may be stored in a non-transitory computer-readable storage medium. The non-transitory computer-readable storage medium may be the computer-readable storage medium included in the memory in the foregoing embodiment, or may be a computer-readable storage medium that exists independently and that is not disposed in a terminal. The computer-readable storage medium stores at least one instruction, at least one program, a code set or an instruction set, the at least one instruction, the at least one program, the code set or the instruction set being loaded and executed by a processor to implement the method for application of a scope in a virtual environment according to the embodiments of this disclosure.

Optionally, the non-transitory computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this disclosure are merely for description purpose, and are not intended to indicate priorities of the embodiments.

A person of ordinary skill in the art may understand that all or some of the steps in the embodiments may be implemented by hardware or a program instructing relevant hardware. The program may be stored in a non-transitory computer-readable storage medium. The non-transitory storage medium may include: a ROM, a magnetic disk, or an optical disc, or the like.

The foregoing descriptions are merely exemplary embodiments of this disclosure, and are not intended to limit this application. Any modification, equivalent replacement, improvement and the like made within the spirit and principle of this application shall fall within the protection scope of this application.

What is claimed is:

1. A method for applying a scope accessory in a virtual environment, the method being performed by a terminal and comprising:
    displaying a first environment interface, the first environment interface comprising a person perspective picture of the virtual environment observed from a person perspective of a virtual object, the virtual object holding a virtual item, the virtual item being equipped with the scope accessory, and the first environment interface further comprising a scope control;
    receiving a touch operation on the scope control for a touch duration, wherein the touch operation comprises a drag operation performed on the scope control during the touch duration;
    in response to receiving the touch operation, displaying a second environment interface, the second environment interface comprising a scope picture of the virtual environment observed by using the scope accessory, wherein the second environment interface is continuously displayed during the touch duration, and wherein the scope picture is initially displayed in a first perspective direction in response to initial receipt of the touch operation;
    receiving the drag operation on the scope control before an end of the touch operation;
    in response to receiving the drag operation, moving the scope picture of the second environment interface from the first perspective direction to a second perspective direction corresponding to the drag operation;
determining an amount of the touch duration in response to the end of the touch operation;
determining a de-activation condition for the scope accessory based on the touch duration and a duration threshold; and
disabling the scope accessory and resuming displaying the person perspective picture in response to the de-activation condition being met.

2. The method according to claim 1, wherein determining the de-activation condition for the scope accessory based on the touch duration comprises:
in response to the touch duration reaching the duration threshold, determining the end of the touch operation to be the de-activation condition.

3. The method according to claim 1, wherein determining the de-activation condition for the scope accessory based on the touch duration comprises:
in response to the touch duration not reaching the duration threshold, determining a reception of a tap signal to be the de-activation condition.

4. The method according to claim 1, wherein before the receiving the touch operation on the scope control, the method further comprises:
receiving a trigger operation on a function setting control;
displaying a function setting interface according to the trigger operation, the function setting interface comprising a scope setting option, the scope setting option comprising a hybrid control option; and
receiving an enabling operation on the hybrid control option, the hybrid control option being used for determining a disabling manner of the scope accessory by using the duration threshold as a critical duration.

5. The method according to claim 1, wherein in response to the virtual environment being not observed by using the scope accessory, a speed at which a perspective direction is adjusted is a first adjustment speed; and
adjusting the first perspective direction according to the drag operation comprises:
adjusting the first perspective direction at a second adjustment speed according to the drag operation, the second adjustment speed being less than the first adjustment speed.

6. The method according to claim 1, wherein receiving the touch operation on the scope control comprises:
receiving the touch operation on a touchscreen;
determining first coordinates corresponding to the touch operation on the touchscreen;
determining second coordinates corresponding to a center point of the scope control on the touchscreen; and
determining, in response to a distance between the first coordinates and the second coordinates being less than a required distance, that the touch operation is the touch operation performed on the scope control.

7. A device capable of applying a scope accessory in a virtual environment, the device comprising:
a memory storing computer readable instructions; and
a processor in communication with the memory, the processor when executing the computer readable instructions is configured to:
display a first environment interface, the first environment interface comprising a person perspective picture of the virtual environment observed from a person perspective of a virtual object, the virtual object holding a virtual item, the virtual item being equipped with the scope accessory, and the first environment interface further comprising a scope control;
receive a touch operation on the scope control for a touch duration, wherein the touch operation comprises a drag operation performed on the scope control during the touch duration;
in response to receipt of the touch operation, display a second environment interface, the second environment interface comprising a scope picture of the virtual environment observed by using the scope accessory, wherein the processor is configured to continuously display the second environment interface during the touch duration, and initially display the scope picture in a first perspective direction in response to initial receipt of the touch operation;
receive the drag operation on the scope control before an end of the touch operation;
in response to receipt of the drag operation, move the scope picture of the second environment interface from the first perspective direction to a second perspective direction corresponding to the drag operation;
determine an amount of the touch duration in response to the end of the touch operation;
determine a de-activation condition for the scope accessory based on the touch duration and a duration threshold; and
disable the scope accessory and resuming displaying the person perspective picture in response to the de-activation condition being met.

8. The device according to claim 7, wherein when the processor is configured to determine the de-activation condition for the scope accessory based on the touch duration, the processor is configured to:
in response to the touch duration reaching the duration threshold, determine the end of the touch operation to be the de-activation condition.

9. The device according to claim 7, wherein when the processor is configured to determine the de-activation condition for the scope accessory based on the touch duration, the processor is configured to:
in response to the touch duration not reaching the duration threshold, determine a reception of a tap signal to be the de-activation condition.

10. The device according to claim 7, wherein before the processor is configured to receive the touch operation on the scope control, the processor is configured to:
receive a trigger operation on a function setting control;
display a function setting interface according to the trigger operation, the function setting interface comprising a scope setting option, the scope setting option comprising a hybrid control option; and
receive an enabling operation on the hybrid control option, the hybrid control option being used for determining a disabling manner of the scope accessory by using the duration threshold as a critical duration.

11. The device according to claim 7, wherein in response to the virtual environment being not observed by using the scope accessory, a speed at which a perspective direction is adjusted is a first adjustment speed; and
when the processor is configured to adjust the first perspective direction according to the drag operation, the processor is configured to:
adjust the first perspective direction at a second adjustment speed according to the drag operation, the second adjustment speed being less than the first adjustment speed.

12. The device according to claim 7, wherein when the processor is configured to receive the touch operation on the scope control, the processor is configured to:
- receive the touch operation on a touchscreen;
- determine first coordinates corresponding to the touch operation on the touchscreen;
- determine second coordinates corresponding to a center point of the scope control on the touchscreen; and
- determine, in response to a distance between the first coordinates and the second coordinates being less than a required distance, that the touch operation is the touch operation performed on the scope control.

13. A non-transitory storage medium for storing computer readable instructions, the computer readable instructions, when executed by a processor in a device capable of applying a scope accessory in a virtual environment, causing the processor to:
- display a first environment interface, the first environment interface comprising a person perspective picture of the virtual environment observed from a person perspective of a virtual object, the virtual object holding a virtual item, the virtual item being equipped with the scope accessory, and the first environment interface further comprising a scope control;
- receive a touch operation on the scope control for a touch duration, wherein the touch operation comprises a drag operation performed on the scope control during the touch duration;
- in response to receipt of the touch operation, display a second environment interface, the second environment interface comprising a scope picture of the virtual environment observed by using the scope accessory, wherein the second environment interface is continuously displayed during the touch duration, and wherein the scope picture is initially displayed in a first perspective direction in response to initial receipt of the touch operation;
- receive the drag operation on the scope control before an end of the touch operation;
- in response to receipt of the drag operation, move the scope picture of the second environment interface from the first perspective direction to a second perspective direction corresponding to the drag operation;
- determine an amount of the touch duration of the touch operation in response to the end of the touch operation;
- determine a de-activation condition for the scope accessory based on the touch duration and a duration threshold; and
- disable the scope accessory and resuming displaying the person perspective picture in response to the de-activation condition being met.

14. The non-transitory storage medium according to claim 13, wherein, when the computer readable instructions cause the processor to determine the de-activation condition for the scope accessory based on the touch duration, the computer readable instructions cause the processor to:
- in response to the touch duration reaching the duration threshold, determine the end of the touch operation to be the de-activation condition.

15. The non-transitory storage medium according to claim 13, wherein, when the computer readable instructions cause the processor to determine the de-activation condition for the scope accessory based on the touch duration, the computer readable instructions cause the processor to:
- in response to the touch duration not reaching the duration threshold, determine a reception of a tap signal to be the de-activation condition.

16. The non-transitory storage medium according to claim 13, wherein, before the computer readable instructions cause the processor to receive the touch operation on the scope control, the computer readable instructions cause the processor to:
- receive a trigger operation on a function setting control;
- display a function setting interface according to the trigger operation, the function setting interface comprising a scope setting option, the scope setting option comprising a hybrid control option; and
- receive an enabling operation on the hybrid control option, the hybrid control option being used for determining a disabling manner of the scope accessory by using the duration threshold as a critical duration.

17. The non-transitory storage medium according to claim 13, wherein in response to the virtual environment being not observed by using the scope accessory, a speed at which a perspective direction is adjusted is a first adjustment speed; and
wherein, when the computer readable instructions cause the processor to adjust the first perspective direction according to the drag operation, the computer readable instructions cause the processor to:
- adjust the first perspective direction at a second adjustment speed according to the drag operation, the second adjustment speed being less than the first adjustment speed.

* * * * *